United States Patent [19]

Regnault

[11] Patent Number: 4,905,018

[45] Date of Patent: Feb. 27, 1990

[54] INK JET PRINTING HEAD AND INDUSTRIAL PLOTTER WHICH IS EQUIPPED WITH IT

[75] Inventor: Luc Regnault, Bourg les Valence, France

[73] Assignee: Imaje S.A., Bourg les Valence, France

[21] Appl. No.: 180,103

[22] PCT Filed: Jul. 20, 1987

[86] PCT No.: PCT/FR87/00286

§ 371 Date: May 19, 1988

§ 102(e) Date: May 19, 1988

[87] PCT Pub. No.: WO88/00529

PCT Pub. Date: Jan. 28, 1988

[30] Foreign Application Priority Data

Jul. 21, 1986 [FR] France ................................ 86 10727

[51] Int. Cl.⁴ .............................................. G01D 15/18

[52] U.S. Cl. ........................................................ 346/75

[58] Field of Search .......................................... 346/75

[56] References Cited

U.S. PATENT DOCUMENTS 3,914,772 10/1975 Kashio ................................. 346/75

3,972,052 7/1976 Atumi et al. ......................... 346/75

4,384,296 5/1983 Torpey ................................ 346/75

FOREIGN PATENT DOCUMENTS 2234823 1/1975 France .

356477 10/1961 Switzerland .

531935 2/1973 Switzerland .

2098546 11/1982 United Kingdom .

81/03149 12/1981 World Int. Prop. O. .

OTHER PUBLICATIONS

Patent Abstracts of Japan, vol. 5, No. 127, (M-83) (799) Aug. 15, 1981, See the Whole Abstract & JP, A, 5664874 (M. Nagagaki) Jun. 2, 1981.

*Primary Examiner*—B. A. Reynolds
*Assistant Examiner*—Gerald E. Preston
*Attorney, Agent, or Firm*—Oblon, Spivak, McClelland, Maier & Neustadt

[57] ABSTRACT

Ink jet printing head and replacement of bevel sticks in industrial tracers by an ink jet printing head provided with a set of deflection plates (3, 4, 5) so arranged and polarized that the electric field of deflection of droplets is orientable according to an angle which may vary from 0° to 180°. The applications cover particularly the field of industrial tracing techniques.

8 Claims, 6 Drawing Sheets

INK JET PRINTING HEAD AND INDUSTRIAL PLOTTER WHICH IS EQUIPPED WITH IT

FIELD OF THE INVENTION

The invention relates to an ink jet printing head; it relates more particularly to its applications to industrial plotters.

BACKGROUND OF THE INVENTION

These latter appear in different forms, but all are composed of a part carrying the sheets (support medium) for receiving the plots, another part supporting one or more styluses, these two parts being set in relative movement, either by moving the sheets, or by moving the styluses, or by a combination of both methods.

In these industrial plotters, the styluses depositing the ink are often either ballpoint pens, or felt tips, or else hollow tips for special inks of Indian ink type.

These styluses have several drawbacks among which may be mentioned the need of contact, during printing, between the printed medium and the stylus. Now, in the technology of the stylus and the quality of the surface of the printed medium, the quality of the plot is not constant and is not always the best, particularly when the medium to be printed is abrasive on the surface (paper . . . ), which results in a useful life of the stylus which is often very short, regardless of its technology.

Another drawback resides in the fact that the absence of printing during movement of the printed medium requires the stylus to be lifted, which results in a considerable waste of time during execution of the plot. Furthermore, on resuming the plot, the ink of the stylus does not always flow instantaneously, whence marks appear at the beginning of the plot.

A difficulty also arises as regards the compatibility between the ink, the technology of the stylus, and the quality of the medium to be printed which is not obvious and which results in greatly limiting the quality and the useful life of the plot on its medium. Generally, for each type of medium (different qualities of paper, mylar, polyester film . . . ), it is advisable to use a different type of stylus (ballpoint pens, felt tips, hollow tubes . . . ).

OBJECT OF THE INVENTION

The object of the invention is to avoid all of the above mentioned drawbacks, by proposing a solution of replacing existing styluses by a continuous ink jet printing head adapted to the needs of industrial plotting.

SUMMARY OF THE INVENTION

The invention concerns more precisely a continuous ink jet printing head associated with an ink flow system, comprising a recovery channel, this head being formed essentially of a modulation system, an ejection nozzle, electrodes for charging the drops, and a deflection system, characterized in that this deflection system includes a set of deflection plates placed and fed by means of an electronic circuit so that the electric field (E) for deflecting the drops is orientable through an angle which may vary from 0° to 180°.

BRIEF DESCRIPTION OF THE DRAWINGS

The invention will be better understood from the following explanations and the accompanying FIGS. in which.

For the sake of clarity the same elements bear the same references throughout the FIGS.

DETAILED DESCRIPTION OF THE PRESENTLY PREFERRED EMBODIMENTS

Figure 1:
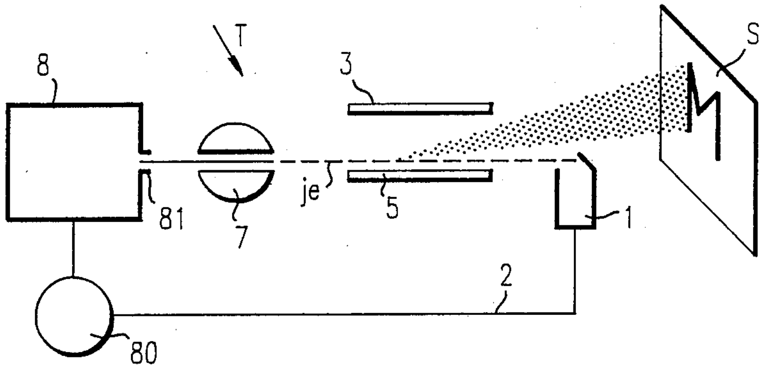
FIG. 1 PRIOR ART
FIG. 1 illustrates diagrammatically the standard ink jet technique.

FIG. 1 is a FIG. of the known art which illustrates the ink jet printing technique concerned.

This technique consists of forming a continuous jet of calibrated drops (je) supplied by a modulation system (8) connected to an ink feed device (80) having an ejection nozzle (81). At the level of the break up of the jet leaving the ejection nozzle (81), the drops are charged electrostatically by means of charging electrodes (7). Deflection plates (3, 5) creating an electric field deflect them from their path. All of these modulation, ejection, charging and deflection means constitute the printing head (T). If the medium (S) on which it is desired to write and the printing head (T) are in relative movement, a printing matrix is formed. In the example described, it is an "M". All of the drops not used are recovered in a channel (1) before being recycled in the ink flow system (2).

Figure 2:
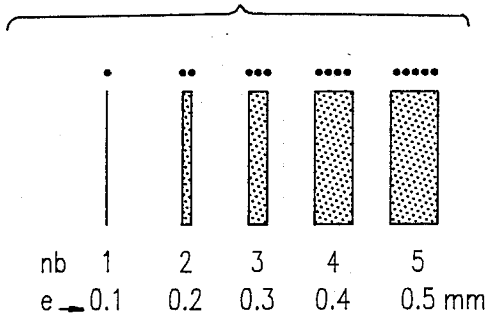
FIG. 2 is an illustration of the thicknesses of the variable lines which may be obtained by the ink jet technique.

As shown in FIG. 2, different thicknesses of lines may be obtained by juxtaposing several drops. Lines of thickness e=0.1, 0.2, 0.3, 0.4, 0.5 have been shown. They are composed respectively of a number of drops (nb) varying from 1 to 5 and creating on the medium an impact on the order of 130 microns in diameter.

It is seen therefore, on the one hand, that between the printing head and the medium there is no bearing point, which eliminates the major drawbacks connected with this contact, drawbacks that are encountered in machines where a stylus is used for forming a plot on a support medium. On the other hand, it is seen that a single printing head allows lines of different thicknesses to be obtained, whereas each thickness requires the use of an adapted stylus in the case of conventional plotting machines.

This description therefore shows the advantage of replacing the marking elements generally used in industrial plotting machines by an ink jet printing head; here it is an obviously advantageous application of the ink jet technique in the field of industrial plotting.

This invention also has as an object a new printing head particularly adapted for this application as will now be described. In the conventional ink jet technique, as is illustrated in FIG. 1, the jet prints columns of dots. In an industrial plotting machine, the support medium may move in all directions with respect to the stylus. Now, in the known technique of the continuously deflected jet, printing columns of dots (patterns), these latter are always situated in the same plane, which is generally perpendicular to the direction of movement of the object to be marked (see FIG. 1).

One of the important characteristics of the invention resides therefore in the fact that, through a new arrangement of the deflection plates, an orientable electric field is obtained for deflecting the drops. Under these conditions, it becomes possible to maintain the column of dots (1 to 5 dots in the example of FIG. 2), composed of a set of deflected drops (pattern) in a plane which is always perpendicular to the relative direction of movement of the medium to be printed, whatever this direction. An electronic control circuit cooperates with this new set of deflection plates according to the invention, which circuit will be described hereafter. In addition, in some embodiments, an adaptation of the shape of the channel contributes to the success of the process.

Figure 3A:
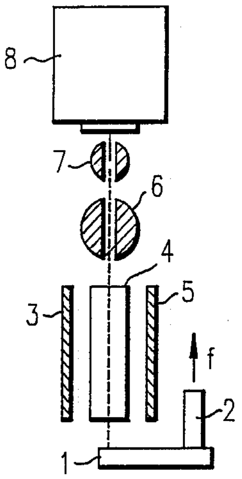
FIGS. 3*a* and 3*b* illustrate diagrammatically and respectively a printing head according to a first embodiment of the invention seen from the front, and the deflection plates of the head seen from above.
Figure 3B:
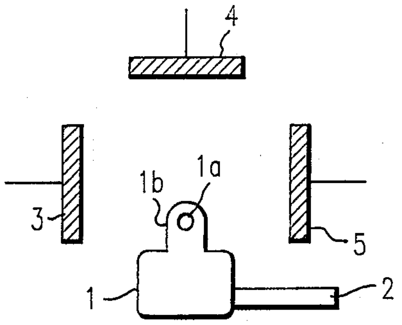

A first embodiment of a printing head according to the invention is shown, in a top view, in FIG. 3*a*, whereas FIG. 3*b* illustrates the new set of deflection plates of this head, seen from the top.

There is a modulation body (8) receiving the pressurized ink and having an ink ejection nozzle forming the ink jet, an electrode for charging the drops associated with a detector (6) of the passage of the drops, a gutter (1) for recovering the ink drops not used for printing, associated with an ink recovery pipe 2 under a partial vacuum (arrow f).

In accordance with the invention, this printing head comprises a combination of three deflection plates (3, 4, 5) for creating an electric field for deflecting the charged drops, orientable through an angle which may vary from 0° to 180°. Two of these plates (3) and (5) are parallel to each other, and the third one (4) is situated in a plane perpendicular to the preceding ones. According to another characteristic of the invention, this set of three deflection plates (3, 4, 5) cooperates with a special recovery channel structure (1) allowing the orientation from 0° to 180° of the deflected drops. The drops fall into a circular orifice (1*a*) formed in a narrowed extension (1*b*) of the flat reservoir forming channel (1). This orifice is situated in the axis of the head (T).

Figure 4A:
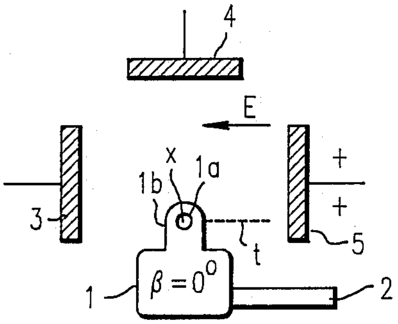
FIGS. 4*a*, 4*b* and 4*c* illustrate the operation of the set of deflection plates of the first embodiment of the invention.
Figure 4B:
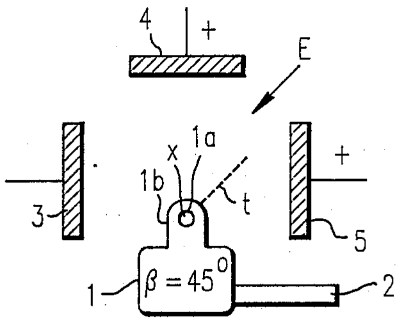
Figure 4C:
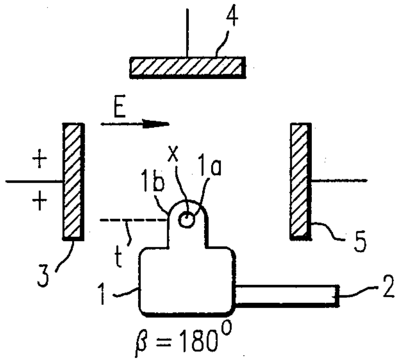

FIGS. 4*a*, 4*b* and 4*c* illustrate by way of example three drop deflection angles, namely:

$\beta = 0°$ $\beta = 45°$ $\beta = 180°$.

To each of these deflection angles there corresponds an electric field (E) created by combining the high voltage supply for each of the three plates.

For an angle $\beta$ of 0°, only the deflection plate (5) is fed.

For an angle $\beta$ of 45°, the deflection plates (4) and (5) are fed simultaneously.

For an angle $\beta$ of 180°, only the deflection plate (3) is fed.

These examples of oriented deflections are made in FIGS. 4*a*, 4*b* and 4*c* with a pattern (T) of four drops, the undeflected jet being shown by a white dot (X) in the gutter (1). By changing the number of drops in the pattern, as explained in FIG. 2, it is then possible to make a plot by choosing the thickness of the line. This line thickness is kept whatever the direction of advance of the support medium, by orienting the deflection field. This is oriented perpendicularly to the direction of advance of the support medium with respect to the plotting head.

Figure 5:
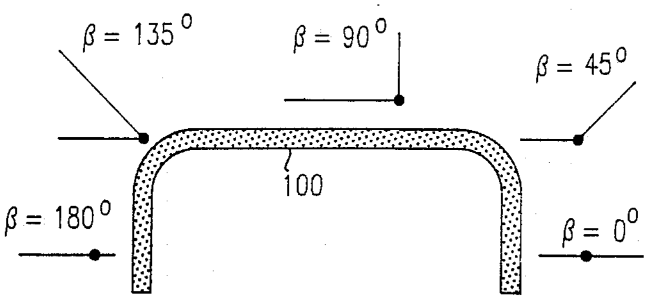
FIG. 5 shows a plot on a medium with orientations of the patterns of different dots.

In FIG. 5 is shown a plot (100) on a support medium (not shown) with orientations of the pattern of different dots, so as to keep a constant line thickness ($\beta = 180°$, 135°, 90°, 45°, 0°).

With respect to a fixed point on the printing head, depending on the angle of deflection at the time, the pattern of dots do not always fall in the same position. Therefore, it is necessary to make a path correction in the relative movement of the printing head with respect to the support medium to be printed as a function of the angle retained in the deflection of the pattern of dots.

Figure 6:
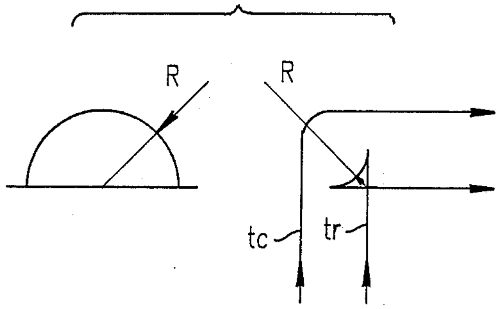
FIG. 6 illustrates the corrected relative head-medium path as a function of the rotation radius of the pattern of dots.
Figure 9A:
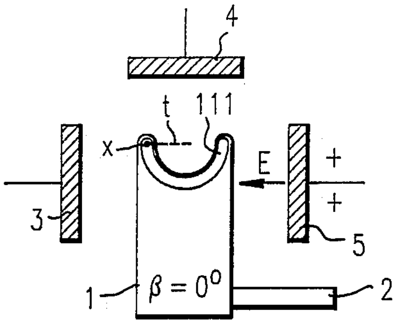
FIGS. 9*a*, 9*b*, 9*c* and 9*d* illustrate the operation of the deflection plates of the second embodiment.
Figure 9B:
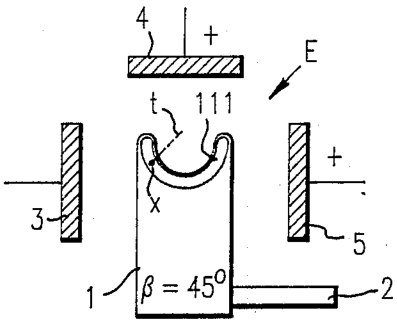
Figure 9C:
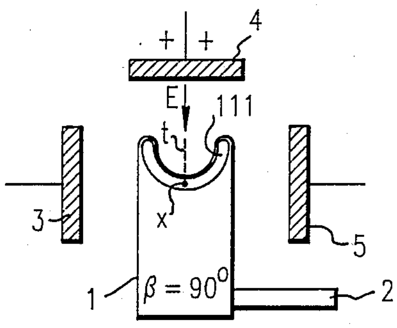
Figure 9D:
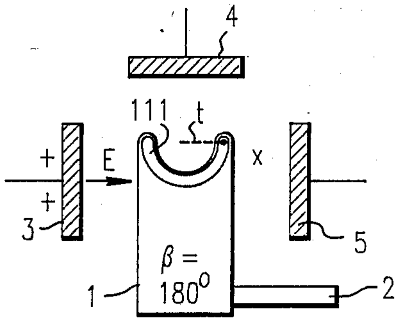

In FIG. 6 there has been shown, as a function of the radius of rotation (R) of the pattern of dots around the axis of the channel, the relative corrected head-support medium path (TR), for a given curve plot (TC). This printing head variant for ink jet plotting requires a program for correcting the path of the curve plot taking into account the radius of deflection of the pattern of dots used for the plot.

Figure 7A:
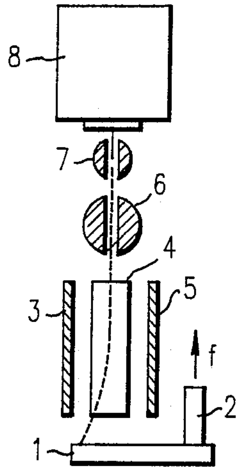
FIGS. 7*a* and 7*b* illustrate respectively in a front view a second embodiment of a printing head according to the invention and, seen from the top, the combination of the set of deflection plates cooperating with a recovery channel of adapted shape.
Figure 7B:
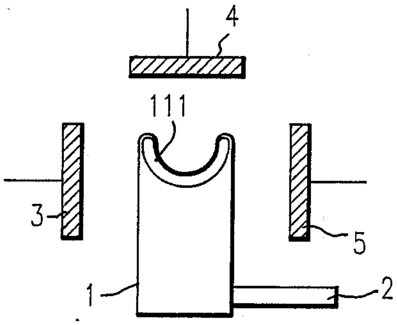
Figure 8:
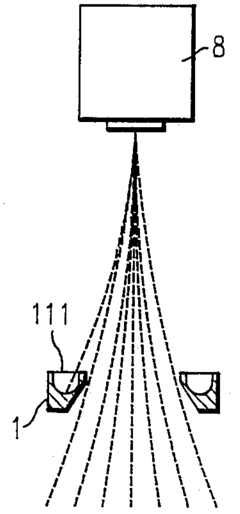
FIG. 8 illustrates the path of the drops in the second embodiment.

A second embodiment of a printing head of the invention is illustrated in FIGS. 7*a* and 7*b*, FIG. 8 and FIGS. 9*a*, 9*b*, 9*c* and 9*d*. As before, FIG. 7*a* shows diagrammatically the printing head seen from the front and FIG. 7*b*, the set of deflection plates seen from the top with the recovery channel (1) exhibiting an original shape adapted to this application. The number of deflection plates is here again equal to three. The same elements as in the preceding embodiment are found here. In this solution, only the shape of the channel and the way in which the drops are used for the printing are changed. In fact, the drops not used for printing are this time systematically deflected into the channel (1) which, in accordance with a characteristic of the invention, comprises a semicircular reception chute (111). The drops used for printing are deflected so that the center of the pattern of printed dots, whatever their number, is in the axis of the head and therefore in the center of the semicircular chute (111) of the channel (1). An example is given in FIG. 8 with a pattern of 5 dots, in a figure in which only the modulation system (8) and channel (1) with its semicircular chute (111) appear.

In FIGS. 9*a*, 9*b*, 9*c* and 9*d* are shown diagrammatically several orientations of the deflection field, respectively 0°, 45°, 90° and 180°; with a pattern of four dots. The drops not used for printing are deflected and shown by the white spot (X) in the chute (111) of the recovery channel (1).

The advantage of this architecture is the possibility of forming a plot, with programmable line thickness, by acting on the number of drops, while keeping this line thickness whatever the relative path of the head and the printed support medium, without needing a relative correction of the path of the head with respect to the support medium as was the case in the preceding embodiment (FIG. 6).

Figure 10:
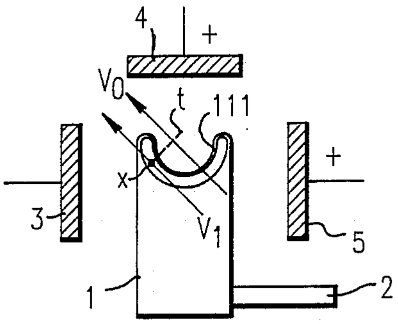
FIG. 10 illustrates the function played by the adapted recovery channel.

Another advantage of this second embodiment resides in the fact that the printing head may withstand considerable accelerations because of the particular arrangement of the recovery channel (1). In fact, during an acceleration (and deceleration) phase of the head in the direction of the vector ($V_0$) shown in FIG. 10 (that is to say, perpendicular to the plane of deflection of the drops), these latter are shifted slightly in the axis of vector ($V_1$) (FIG. 10) during their path. Therefore, there is a risk for the drops not intended for printing of no longer being able to fall into the recovery channel. The arrangement of the channel proposed in the embodiment of FIGS. 7 to 10 mitigates this drawback to the extent that the arc of the circle formed by the chute (111) offers, in the direction of ($V_1$), a very large channel dimension with respect to the other solutions.

The two advantages of this second embodiment (namely, the uselessness of a path correction and the possibility of withstanding high accelerations) make it an advantageous solution for applications in which the speed of plotting is important.

Figure 11:
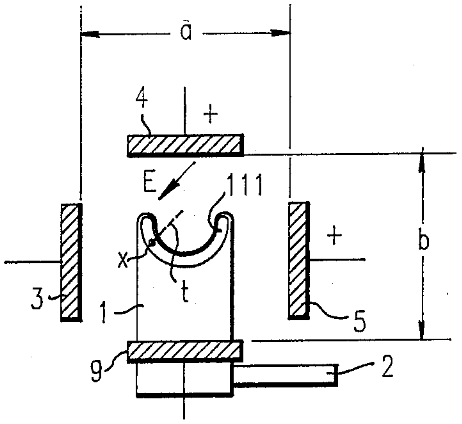
FIG. 11 illustrates a third embodiment of a set of deflection plates according to the invention.

FIG. 11 illustrates a third embodiment of a printing head according to the invention. In this configuration, four deflection plates (3), (4), (5), (9) are provided. The deflection plate (9) is parallel to the deflection plate (4) and perpendicular to the other two (3, 5). A representative case has been shown by way of example in which the deflection plates (4, 5) are live. The calculation of distances (a) and (b) between the plates will be explained subsequently. For the purpose of holding the printing head in position, the fourth deflection plate (9) is retractable.

In accordance with the invention and as has already been mentioned, a circuit (C) for controlling the high deflection voltages cooperates with an orientable deflection printing head according to the invention.

Therefore, the purpose of the circuit (C) for controlling the high deflection voltages is to bring the three deflection plates (3), (4), and (5) of FIG. 3 (or the three or four deflection plates (3), (4), (5), (9) in the embodiments of FIGS. 7 and 11) to adequate potentials so that the deflection plane of the drops is perpendicular at all times to the axis of the relative movement of the printed support medium with respect to the printing head. The voltages of the deflection plates are referenced respectively as ($V_3$, $V_4$, $V_5$, $V_9$).

Figure 12:
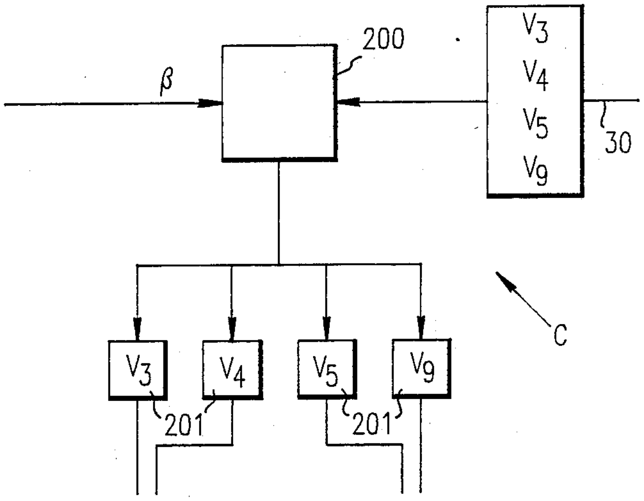
FIG. 12 is an example of an electronic circuit for controlling the deflection voltages.

In a particular example shown in FIG. 12, the angle $\beta$ of the relative movement of the printed support medium with respect to the printing head is transmitted to a control device (200). The control device (200) searches each instant in a memory (30) for the values of the voltages ($V_3$, $V_4$, $V_5$, $V_9$) which it is necessary to apply to the electrodes so as to obtain the orientation of the pattern along with the desired angle ($\beta$). The same control device (200) continuously controls devices (201) for supplying the deflection plates with voltage. These voltage are characteristic of a given printing head. An example of calculating the values of these voltages is given hereafter.

The voltages of the deflection plates are adjusted so as to create at the level of the drops a resultant electric field (E), of given intensity, and oriented in the plane perpendicular to the axis of relative movement of the printed support medium with respect to the printing head.

Calculations of the voltages ($V_3$, $V_4$, $V_5$, $V_9$) depends on the geometry of the head considered and requires, strictly speaking, the resolution of the physical problem of the distribution of the electric potential in the printing head, taking into account the geometrical details of the head. This resolution may be made by different methods, including computerized digital resolution methods. When the position of the drops is centered with respect to the electrodes and when the size of the electrodes is large with respect to that of the pattern, a value can be obtained close to the deflection voltages required for obtaining the electric field of value (E) oriented along desired angle ($\beta$).

In this case the following formulae are used:

$$E = \sqrt{E_x^2 + E_y^2} \text{ and } \tan(\beta) = Ey/Ex;$$

the values of (Ex) and (Ey) being calculated from the formulae given hereafter.

$$-E_x =$$

$$\frac{+4V_9}{0}\sum_{n=0}^{n=\infty}\left[\frac{\sinh((2n+1)\pi b/20)\cos((2n+1)\pi/2)}{\sinh((2n+1)\pi b/a)}\right]+$$

$$\frac{4V_5}{b}\sum_{n=0}^{n=\infty}\left[\frac{\cosh((2n+1)\pi a/2b)\sin((2n+1)\pi/2)}{\sinh((2n+1)\pi a/b)}\right]-$$

$$\frac{4V_4}{a}\sum_{n=0}^{n=\infty}\left[\frac{\sinh((2n+1)\pi b/2a)\cos((2n+1)\pi/2)}{\sinh((2n+1)\pi b/a)}\right]-$$

$$\frac{4V_3}{b}\sum_{n=0}^{n=\infty}\left[\frac{\cosh((2n+1)\pi a/2b)\sin((2n+1)\pi/2)}{\sinh((2n+1)\pi a/b)}\right]$$

$$-E_y =$$

$$\frac{-4V_9}{a}\sum_{n=0}^{n=\infty}\left[\frac{\cosh((2n+1)\pi b/2a)\sin((2n+1)\pi/2)}{\sinh((2n+1)\pi b/a)}\right]+$$

$$\frac{4V_5}{b}\sum_{n=0}^{n=\infty}\left[\frac{\sinh((2n+1)\pi a/2b)\cos((2n+1)\pi/2)}{\sinh((2n+1)\pi a/b)}\right]+$$

$$\frac{4V_4}{a}\sum_{n=0}^{n=\infty}\left[\frac{\cosh((2n+1)\pi b/2a)\sin((2n+1)\pi/2)}{\sinh((2n+1)\pi b/a)}\right]-$$

$$\frac{4V_3}{b}\sum_{n=0}^{n=\infty}\left[\frac{\sinh((2n+1)\pi a/2b)\cos((2n+1)\pi/2)}{\sinh((2n+1)\pi a/b)}\right]$$

Figure 13:
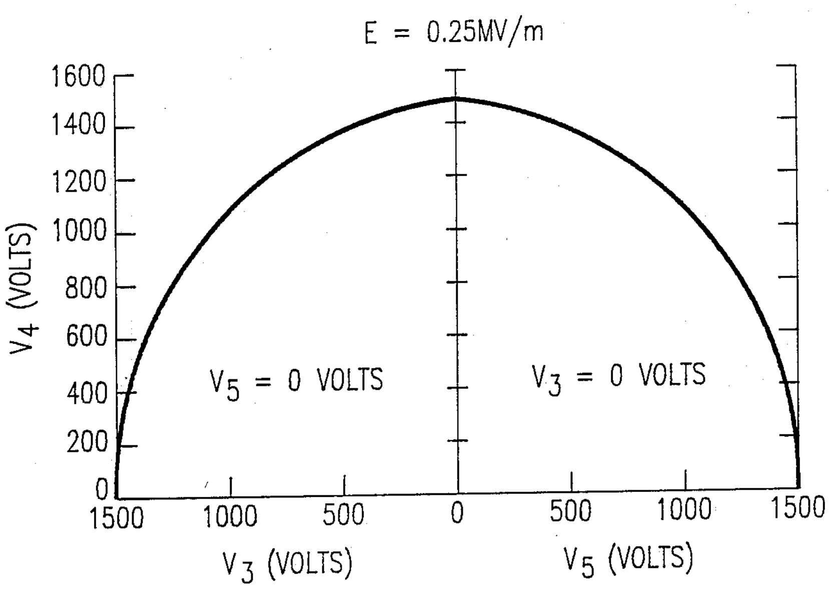
FIGS. 13 and 14 are diagrams illustrating the parameters for controlling these voltages.

In a particular example of application of the embodiment illustrated in FIG. 11, the distances between the electrodes are a=b=5 mm, and the deflection plate (9) is at a zero volt potential. FIG. 13 gives the relationship required between the values of the voltages ($V_3$), ($V_4$), and ($V_5$), so that the value of the resultant electric field at point (j) situated on the axis of the undeflected jet is: E=0.25 MV/m.

Figure 14:
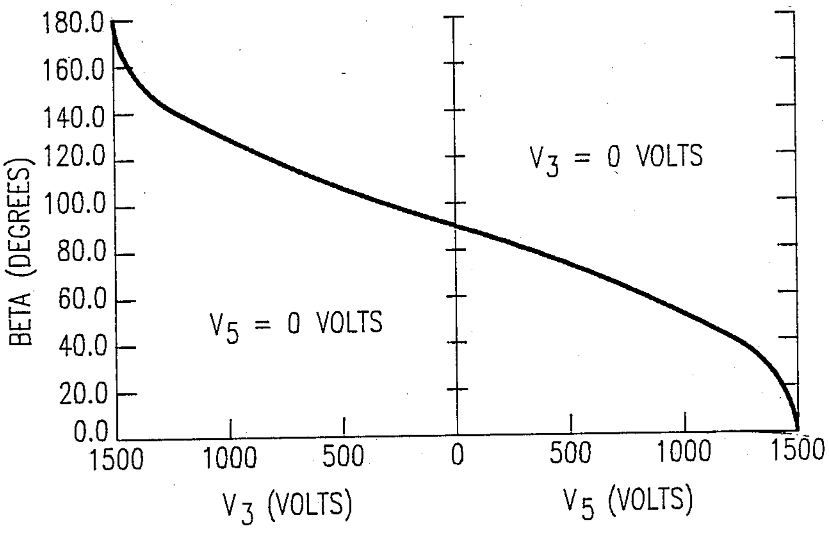

In practice, and by way of illustration, for an angle $\beta$=60°, FIG. 14 gives ($V_5$)=750 V and ($V_3$)=0 V. FIG. 13 then gives ($V_4$)=1300 V. The value of the resultant field is, under these conditions, equal to 0.25 MV/m.

Other voltage combinations may be contemplated for obtaining this result, these combinations follow from the same equations.

In the example given, the ink ejection nozzle has an internal diameter of 25 microns, and the voltages applied to the charging electrode are on the order of 150 V at most for obtaining the desired line widths (0.1 to 0.4 mm).

As was mentioned above, a privileged application of a continuous jet printing head and more particularly an orientable printing head with deflection plates is in the field of industrial plotters. Any contact between the marking element and the support medium to be marked is avoided with all the advantages that that entails. In addition, the thickness of the line may be chosen and kept constant whatever the axis of relative movement of the head with respect to the support medium. Finally, even in an acceleration (deceleration) phase, recovery of the unused ink drops is possible through the provision of a recovery channel with adapted geometry.

I claim:

1. An ink jet printing head comprising:

(a) an ink feed device;

(b) a modulation system having an ejection nozzle operatively connected to said ink feed device;

(c) a charging electrode downstream of said ejection nozzle in position to charge ink droplets ejected by said ejection nozzle;

(d) a first deflection plate downstream of said charging electrode and adjacent the path of the ink droplets;

(e) a second deflection plate downstream of said charging electrode by the same distance as said first deflection plate, adjacent the path of the ink droplets, and perpendicular to said first deflection plate;

(f) a third deflection plate downstream of said charging electrode by the same distance as said first and second deflection plates, adjacent the path of the ink droplet, parallel to said first deflection plate, and perpendicular to said second deflection plate; and (g) electronic circuit means for controlling the voltages on said first, second, and third deflection plates so that the electric field generated by said first, second, and third deflection plates is oriented along an angle $\beta$ which may vary from 0° to 180°.

2. An ink jet printing head as recited in claim 1 and further comprising an ink recovery channel placed downstream of said deflection plates.

3. An ink jet printing head as recited in claim 2 wherein said ink recovery channel has a circular orifice centered on the axis of said ejection nozzle.

4. An ink jet printing head as recited in claim 2 wherein:

(a) said ink recovery channel comprises a semicircular chute centered on the axis of said ejection nozzle and (b) the center of the pattern of the drops used for printing is on the axis of said ejection nozzle.

5. An ink jet printing head as recited in claim 1 and further comprising a fourth deflection plate downstream of said charging electrode by the same distance as said first, second, and third deflection plates, adjacent to the path of the ink droplets, perpendicular to said first deflection plate, parallel to said second deflection plate, and perpendicular to said third deflection plate.

6. An ink jet printing head as recited in claim 5 wherein said fourth deflection plate is retractable.

7. An ink jet printing head as recited in claim 1 wherein said electronic circuit means causes the plane of deflection of the ink droplets to be perpendicular at all times to the axis of relative movement of the media being printed on with respect to said ejection nozzle.

8. An ink jet printing head as recited in claim 1 wherein:

(a) adjacent edges of said first, second, and third electrodes are equidistant from each other by a distance of about 5 mm and (b) the value of the electric field generated by said first, second, and third deflection plates is 0.25 MV/m.

* * * * *